Sept. 8, 1970     D. S. VELEV ET AL     3,527,587
METHOD AND APPARATUS FOR THE CONTINUOUS
PRODUCTION OF FOAM GLASS
Filed April 7, 1966

INVENTORS:
Dimiter Spassov VELEV
Svetlan Zivkov BATCHVAROV
Arthur O. Klein
their Attorney 3,527,587
METHOD AND APPARATUS FOR THE
CONTINUOUS PRODUCTION OF FOAM
GLASS
Dimiter Spassov Velev, Russe, and Svetlan Zivkov Batchvarov, Sofia, Bulgaria, assignors to Nautschno-Izsledovatelski Sektor Pri Vimess, Russe, Bulgaria
Filed Apr. 7, 1966, Ser. No. 562,008
Claims priority, application Bulgaria, Apr. 8, 1965, 4,878
Int. Cl. C03b *19/08*
U.S. Cl. 65—22                                 6 Claims

ABSTRACT OF THE DISCLOSURE

A method and apparatus for continuously manufacturing foam glass, comprising an upright shaft kiln into the upper portion of which there are periodically introduced charges which are spread in layers on previously deposited, still hot and already foamed charges, so that each charge as it is introduced is foamed, adheres to the immediately preceding charge and consequently forms therewith an elongated one-piece column of foam glass which solidifies and continuously increases in length. The thus formed column is simultaneously withdrawn from a lower portion of the shaft kiln at a rate which maintains the length of the solidified column within the shaft kiln substantially constant. The column is stabilized, annealed and cooled as it progresses downwardly through the shaft kiln.

---

Figure 1:
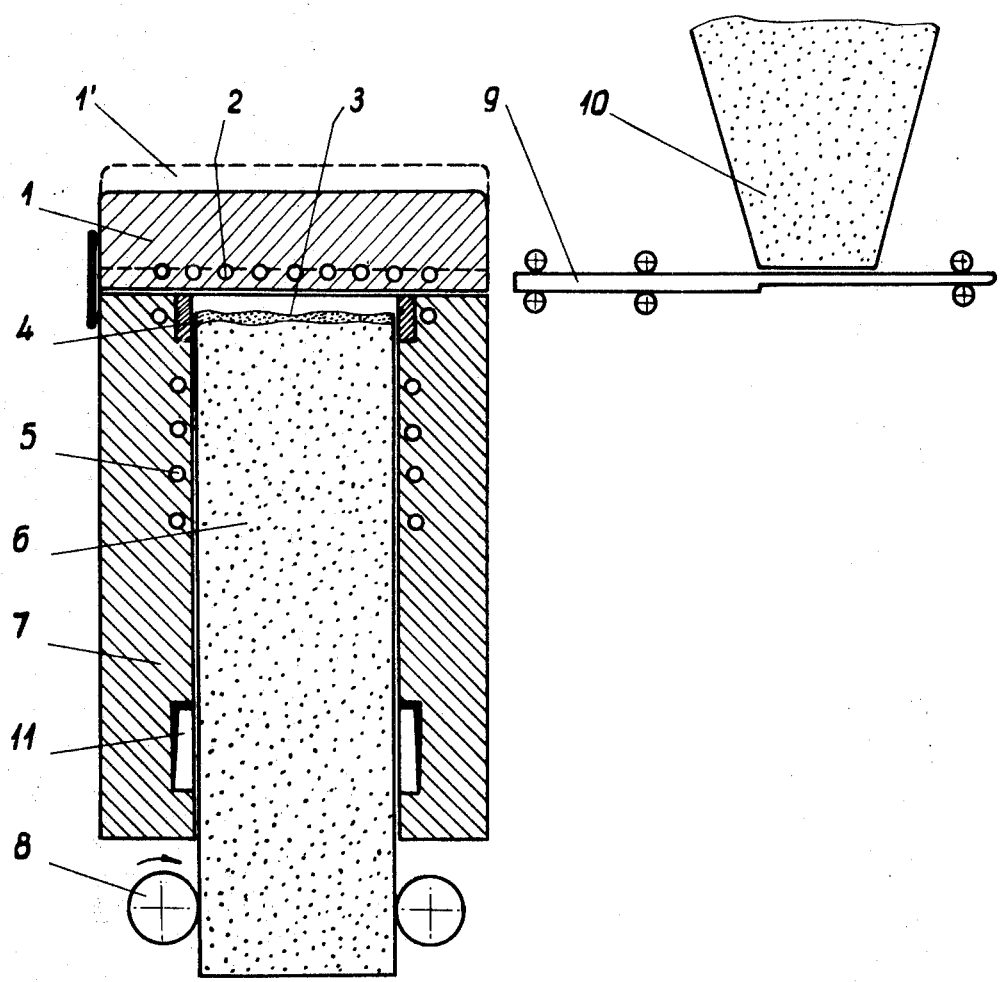

The present invention relates to a method and apparatus for the production of foam glass and the like.

Known methods and apparatus for the production of foam glass and the like usually require tunnel kilns although in some cases furnaces can be periodically charged. The charge conventionally contains solid or liquid foaming agents and is conventionally filled into refractory containers or into conveyor channels having a rectangular cross section. The foaming action takes place in a comparatively thick layer of the charge, and for this purpose a slow gradual heating is required. As a result the known methods and apparatus require preheating of the charge in the containers or conveyor, foaming, stabilizing, annealing and cooling, all of which proceed very slowly so that the known methods and apparatus suffer from a low rate of production resulting in undesirably high cost.

Additional disadvantages of the known methods and apparatus reside in the large waste of heat, particularly with two-stage production methods, high cost for the refractory metals or the like used to contain the charges, relatively small dimensions of the resulting blocks which are capable of being achieved with the known methods and apparatus, and the above-mentioned low rate of production which can be achieved with the expensive equipment.

It is primarily an object of the present invention to provide a method and apparatus capable of continuously manufacturing foam glass and the like while avoiding all of the above drawbacks.

With the method and apparatus of the present invention, for the continuous production of foam glass and the like, each charge is periodically spread in the form of a quick-foaming thin layer directly on the surface of the previously deposited charge which is in the form of a still hot foam glass and which is situated in an upper portion of a generally upright shaft kiln which forms part of the apparatus of the invention. Each newly deposited layer automatically becomes bonded directly to the preceding layer, so that in this way a one-piece integral block of foam glass is continuously produced with the length of the block continuously increasing. The method and apparatus of the present invention will continuously withdraw the column which is continuously increasing in length so that the charge can always be introduced at approximately the same elevation, and as the solidifying column progresses downwardly along the interior of the kiln it is stabilized, annealed, and cooled, so that portions at the lower end of the column can be periodically removed and cut into blocks or slabs having desired dimensions.

Thus, the objects of the present invention include the continuous production of a column of foam glass or the like in an efficient inexpensive manner involving far lower cost than has heretofore been required while at the same time achieving a high quality product with a high rate of production from inexpensive equipment which operates far more efficiently than conventional equipment.

With the present invention the charge is prepared in a conventional manner, and inasmuch as the composition of the charge and its preparation are fully conventional no further description thereof is provided. A mechanical feeding structure quickly feeds the charge so as to deposit it over the surface of the foam glass produced from the preceding charge. The heating and foaming of each new charge is at least partly brought about and very greatly enhanced by the heat which is accumulated in the previously foamed charge in the kiln. In addition, the kiln of the invention has a massive cover from which a considerable amount of heat is radiated and additional heat is derived by generation of heat from the combustion of gas or liquid fuel. The foamed glass layer resulting from the last-introduced charge adheres to the underlying layer of foam glass so as to form a monolithic, one-piece block or column therewith, and this column slides or moves down the shaft kiln of the invention by gravity, being extracted and guided by rollers which are situated adjacent an open bottom end of the shaft kiln so that these rollers pull as well as guide the column out of the shaft, and this withdrawal of the column from the shaft is carried out at a rate which corresponds to the rate at which the column grows at its upper end due to the periodic introduction of new charges. During the creeping or movement in the downward direction in the kiln, the foam glass or the like is stabilized, annealed, and cooled. Lower portions of the column, situated beyond the lower end of the shaft kiln, are periodically removed and cut into the required configurations and sizes.

The kiln of the present invention, in which the foam glass is produced according to the method of the present invention, is in a generally upright position, either vertical or slightly inclined to the vertical, and the kiln of the present invention preferably has a rectangular cross section. It is composed of refractory and other heat-insulating materials as well as heat-resisting metals and other common metals. The lower portion of the kiln which is not particularly subject to extremely high temperatures can be made of ordinary building or construction materials, including concrete.

Figure 2:
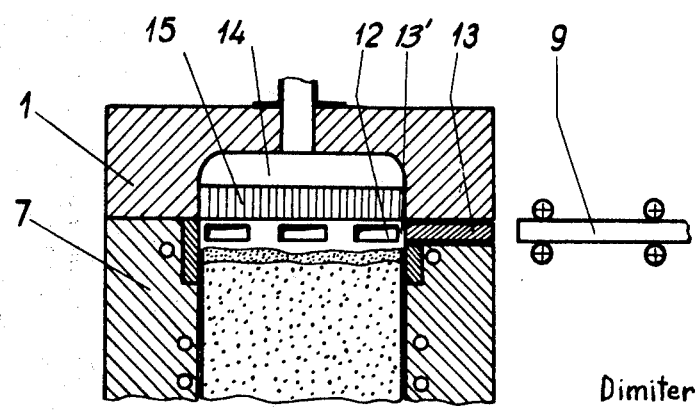

FIG. 1 is a schematic sectional elevation of one possible embodiment of an apparatus according to the present invention for practicing the method of the present invention; and FIG. 2 is a schematic sectional elevation showing the upper portion of the shaft kiln and part of a charging means, FIG. 2 illustrating an embodiment which differs from that of FIG. 1.

Referring now to FIG. 1, there is illustrated therein a hollow shaft kiln of the invention. In the illustrated kiln the upper wall is formed by a cover block in which electrical heaters are mounted. Any suitable lifting structure, which is not illustrated, is provided for periodically raising the cover 1 of the shaft kiln from the illustrated position closing the upper end of the kiln to the dotted line position 1' opening the upper end of the kiln. For this purpose the cover can be provided with a hook or the like connected to the bottom end of a chain which in turn is raised and lowered from a suitable crane in a periodic manner so as to periodically give access to the interior of the kiln. When the kiln is open for a short period of time the cover is returned back down to its closed position shown in solid lines in FIG. 1.

FIG. 1 illustrates the last-introduced charge 3 which is in the form of a layer which is in the process of being foamed. At the elevation of the uppermost layer 3 the shaft kiln of the invention is provided with a means to prevent adhering of the material in the kiln to the wall thereof. This means takes the form of an endless band or ring 4 mounted in a suitable recess formed in the interior surface of the kiln wall and made of a material to which the foaming glass or the like does not adhere. For example the endless member 4 may have an inner coating of graphite which is mixed with other refractory materials, water-cooled metal plates, and the like.

The kiln of the invention has an elongated upright tubular side wall 7 which is made of refractory materials and the like and which is formed with channels 5 which are built into the tubular side wall 7. This tubular side wall 7 has upper and lower open ends, and only the upper end is periodically closed by the above-described movement of the cover block 1 to and from its lower position closing the top end of the kiln. The channels 5 which are formed in the side wall of the kiln accommodate heaters and coolers which are situated in these channels for the purpose of regulating the temperature of the material in the interior of the kiln. For example electrical heaters may be accommodated in the channels for heating purposes, or high-temperature steam may be circulated therethrough in a controlled manner. Also, suitable coils through which cooling water is circulated may be provided, and in this way regulation of the annealing and cooling of the column is controlled. It is thus possible to control the vertical temperature gradient in the column of foam glass or the like as it progresses downwardly through the shaft kiln.

As is schematically indicated at the lower portion of FIG. 1, extracting rollers 8 are provided in order to engage directly the exterior surface of the column 6 which has solidified by the time it reaches the open bottom end of the shaft kiln, and these rollers 8 are continuously or intermittently rotated so as to withdraw the column 6 at a rate corresponding to its growth at the upper end due to the periodic introduction of the charges. In this way it is possible to introduce each charge at approximately the same elevation within a relatively small range.

The lower portion of the side wall 7 is formed with relatively large ports 11 which can be used to provide an intense cooling subsequent to the annealing of the material 6.

A feeding means is provided for periodically feeding charges in a manner which deposits each charge quickly while evenly spreading the charge over the entire working surface in a single thin, uniform layer which is immediately spread in the form of a layer or which is deposited in the form of parallel strips of the charging material. The charge is derived from the hopper 10, schematically shown in FIG. 1, and it is transported from the hopper 10 into the furnace, when the cover 1 is in its open position, by a conventional feeding means 9 which is also schematically illustrated. Relatively large shaft kilns may be provided with two or more charge feeders 9. The charge is heated either directly or through a wall, such as a protective wall, by combustion of gas or liquid fuel fed to burners which are mounted either in the cover 1 or adjacent thereto.

The lower portion of the column 6 which is situated downwardly beyond the extracting rollers 8 is periodically removed from the remainder of the column and cut into the desired shapes of slabs and the like.

FIG. 2 illustrates another possible embodiment of a shaft kiln of the present invention capable of achieving foam glass and the like according to the method of the invention. In the case of FIG. 2 a combustible air-gas mixture is fed directly into the upper chamber 14 of the kiln. This combustible mixture penetrates into relatively small cavities of a porous block 15 where an exceedingly intense fuel combustion takes place, generating a high and even heat. The combustion gases escape through the ports 12.

With the embodiment of FIG. 2 the cover 1 remains in the position illustrated in FIG. 2, and instead a means 13 is provided for automatically closing a port 13' through which the charge is fed into the shaft kiln. Otherwise the construction of FIG. 2 is identical with that of FIG. 1.

As compared with known methods and apparatus, the method and apparatus of the invention reduce fuel expenses, require only simple equipment, make it possible to provide for full mechanization and automation, eliminate the requirement of individual refractory boxes to contain the charges, make it possible to produce relatively large blocks and slabs, provide an easy precise control of the foaming process and therefore of the size of the pores of the foam glass or the like, have a high rate of production and therefore a low production cost, and are capable of producing foam glass of high technical quality and low cost either in plain form or colored for decorative purposes.

What is claimed is:

1. In a method for the continuous production of foam glass in an upright shaft kiln, the steps of periodically introducing into an upper portion of the shaft kiln foamable charges and spreading the charges in layers on previously deposited, still hot and already foamed charges, so that each charge as it is introduced is foamed, adheres to the immediately preceding charge, and thus forms therewith and with an entire series of previous charges an elongated one-piece column which solidifies and continuously increases in length as each charge is introduced, simultaneously withdrawing the thus-formed column from a lower portion of the shaft kiln at a rate which maintains the upper portion of the column onto which each new charge is deposited at least approximately within a range of elevations corresponding to the thickness of each layer of new charge which is periodically introduced, and stabilizing, annealing, and cooling the column as it progresses downwardly in the kiln.

2. In a method as recited in claim 1, periodically removing a lower portion of the column from the remainder thereof which still extends into the shaft kiln, and further treating the removed lower portion of the column.

3. Apparatus for continuously producing foam glass, comprising an elongated generally upright shaft kiln composed at least in part of heat-resistant refractory materials and including an upper cover, charging means for periodically introducing a charge into the kiln at an upper portion thereof adjacent said cover and to spread the charge in a layer on a previously deposited charge which is still hot and already foamed heating means carried by said kiln adjacent said cover for heating the upper portion of said kiln, means carried by said kiln in said upper portion thereof for preventing the charge which is heated in the kiln from adhering thereto, temperature-controlling means carried by kiln walls at an elevation lower than said upper portion thereof for controlling the temperature of the material which solidifies in the kiln, and means located adjacent the open lower end of said kiln for progressively withdrawing from the interior thereof material which solidifies therein, said kiln having an elongated hollow shaft extending from said upper cover to said open lower end, and said shaft having an inner surface directly engaging throughout most of its length the material within the kiln for determining the cross section thereof.

4. The combination of claim 3 and wherein said cover rests on a top end of said shaft of said kiln so that said cover is displaceable vertically to and from a position closing the kiln so that when said cover is displaced upwardly from its position closing the kiln to an upper position opening the kiln a new charge can be introduced.

5. The combination of claim 3 and wherein a side wall portion of the kiln adjacent said cover thereof is formed with a port for giving access to the interior of the kiln for introduction of a charge into the latter.

6. The combination of claim 3 and wherein a porous combustion wall is located in the upper portion of the kiln for providing an intense, even heat.

References Cited

UNITED STATES PATENTS

| | | | |
|---|---|---|---|
| 2,620,597 | 12/1952 | Ford | 65—22 |
| 3,293,692 | 12/1966 | Rosenbaum | 65—22 |
| 2,716,498 | 8/1955 | Childs | 214—18.2 |
| 2,960,323 | 11/1960 | Ludin | 263—29 |

S. LEON BASHORE, Primary Examiner

S. R. FRIEDMAN, Assistant Examiner

U.S. Cl. X.R.

65—335, 347; 263—29